No. 782,740.

Patented February 14, 1905.

UNITED STATES PATENT OFFICE.

EMIL FISCHER, OF BERLIN, GERMANY, ASSIGNOR TO THE FIRM OF E. MERCK, OF DARMSTADT, GERMANY, A COPARTNERSHIP.

DIPROPYL-BARBITURIC ACID, ANALOGOUS DERIVATIVES, AND PROCESS OF MAKING THEM.

SPECIFICATION forming part of Letters Patent No. 782,740, dated February 14, 1905.

Original application filed January 22, 1903, Serial No. 140,108. Divided and this application filed August 16, 1904. Serial No. 220,967.

(Specimens.)

*To all whom it may concern:*

Be it known that I, EMIL FISCHER, a subject of the Emperor of Germany, and a resident of Berlin, Germany, have invented new and useful Improvements in Dipropyl - Barbituric Acid and Analogous Derivatives and Process of Making Them; and hereby I declare the following to be a clear and exact description of my invention.

My invention relates to the production of disubstituted derivatives of barbituric acid.

The present application, which is a divisional application from my application, Serial No. 140,108, filed January 22, 1903, covers specifically the new barbituric-acid derivatives, containing as substituting groups two radicals, such as propyl, for which may be substituted any higher homologous and analogous group and which were denoted in example Nos. 3, 5, 7, 11 of said application. These new products are characterized by the general formula

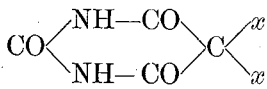

in which $x$ means substituting groups of the above description. According to my researches these new compounds are obtained by condensing disubstituted malonic-acid-ester derivatives, containing as substituting groups the propyl radical for which may be substituted any higher homologous and analogous groups, with urea in the presence of metal alcoholate. In this manner disubstituted barbituric acids are obtained which form colorless crystals difficultly soluble in water, soluble in sodium hydrate and potassium hydrate, thus forming salts by the replacement of the hydrogen of the NH group by metal. These products possess therapeutic value as hypnotics, the average dose for medicinal purposes being one-half to one gram.

In carrying out my process practically I can proceed as follows:

1. *Dipropyl - barbituric acid.* — Twenty parts, by weight, of dipropyl - malonic - acid diethyl ester are introduced into a cold solution of 5.7 parts, by weight, of sodium in one hundred and ten parts, by weight, of absolute alcohol. Then 7.5 parts, by weight, of urea are added, and the mixture is heated to about 100° centigrade in a closed vessel for four hours. The hereby-formed sodium salt of dipropyl-barbituric acid is soluble in alcohol, and the slight precipitate occurring during the operation consists almost altogether of sodium carbonate. Therefore to isolate the dipropyl-barbituric acid the alkaline alcoholic solution is diluted with water supersaturated with hydrochloric acid and its alcohol removed by evaporation. Dipropyl-barbituric acid being poorly soluble in water, separates first as a tenacious oil, but on cooling soon solidifies. On filtration it is purified by recrystallizing from hot water. It then forms short thick colorless crystals. The yield is also in this case a pretty good one. The acid has the composition

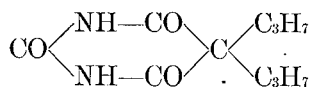

It melts at 145° centigrade and is difficultly soluble in cold water. It forms a crystallizing sodium salt which after drying at 100° centigrade, loses water of crystallization. Its formula is $C_{10}H_{15}O_3N_2Na$. It is very soluble in water and has a bitter taste.

2. *Di-iso-butyl-barbituric acid.* — The fundamental material herefor is di-iso-butyl-malonic-acid ester. The combination of the ester with the urea in the presence of sodium ethylate may be brought about exactly as in the above example, only it is advisable to prolong the duration of the heat to six to seven hours. Di-iso-butyl-barbituric acid dissolves readily in hot alcohol, with great difficulty in hot water, and crystallizes from the latter on cooling in colorless thin leaflets. The acid has the composition $C_{12}H_{20}O_3N_2$ and melts at 173.5° centigrade.

3. *Di-iso-amyl-barbituric acid.*—This compound is prepared in the same way as the compound described above from di-iso-amyl-malonic diethyl ester and is soluble in water with still greater difficulty than the other. It crystallizes from hot water in fine colorless little needles. The melting-point of this acid is 172° centigrade.

4. *Dibenzyl-barbituric acid.*—4.7 parts of sodium are dissolved in seventy-five parts of alcohol. Twenty parts of dibenzyl-malonic-diethyl ester and 4.8 parts of urea are added, and a temperature of 105° to 108° centigrade is applied for four hours. The solution filtered from the precipitated carbonate is diluted with water, and the alcohol is evaporated under reduced pressure. Hereby a mass (insoluble in alkali) is precipitated and after the addition of some alkali and digestion with the liquid is filtered off. The mother-lye on being acidulated precipitates dibenzyl-barbituric acid, which is purified by recrystallizing from hot alcohol. The melting-point of this acid is 222° centigrade.

Although I have above described examples by which the disubstituted barbituric acids may be obtained, nevertheless I do not wish to be understood as thereby excluding equivalents for the ingredients, the apparatus, or the operations employed in the process. It is probable that substitutes may be employed without departing from the scope of the invention intended to be secured hereby. For example, acetyl urea may be employed in the described processes without changing the resulting products, the acetyl group being split off in the reaction.

The new disubstituted barbituric acids possess the property of forming salts with many metals—for example, the alkali metals—the hydrogen of the NH group being replaced by the metal.

Having now described my invention and in what manner the same is to be performed, what I claim as new, and desire to secure by Letters Patent, is—

1. The herein-described new process of making disubstituted barbituric acids having the general formula:

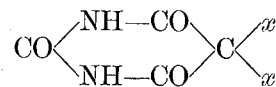

in which $x$ represents the propyl radical for which may be substituted any higher homologous and analogous groups, consisting in condensing the corresponding disubstituted malonic-acid esters with urea in the presence of metal alcoholate, decomposing the thus-formed sodium salts of the disubstituted barbituric acids by means of acid, producing thereby the free disubstituted barbituric acids.

2. The herein-described new process of making dipropyl barbituric acid, consisting in condensing dipropyl malonic ester with urea in the presence of metal alcoholate and transforming the thus-formed sodium salts of the dipropyl barbituric acid into the free dipropyl barbituric acid by means of acid.

3. The herein-described new products, being disubstituted barbituric acids, having the general formula:

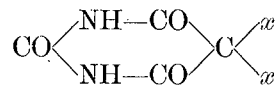

in which $x$ represents the propyl radical, for which may be substituted any higher homologous and analogous groups, and characterized by forming crystals difficultly soluble in hot water and soluble in solutions of alkali and in the salt form of which the hydrogen of the NH group is replaced by the alkali metal.

4. The herein-described new dipropyl barbituric acid, which in the acid form melts at 145° centigrade when recrystallized from hot water and is soluble in solutions of sodium hydrate and potassium hydrate and in the salt form of which the metal replaces the hydrogen of the NH group.

In testimony whereof I have signed my name in the presence of two subscribing witnesses.

EMIL FISCHER.

Witnesses:
E. ALDERHALDEN,
F. REUTER.